(12) United States Patent
Hietalahti et al.

(10) Patent No.: US 8,477,752 B2
(45) Date of Patent: Jul. 2, 2013

(54) DEACTIVATING EXISTING BEARER/CONTEXT FOR EMERGENCY BEARER ESTABLISHMENT

(75) Inventors: Hannu P. Hietalahti, Kiviniemi (FI); Marko T. Akselin, Oulu (FI)

(73) Assignee: Renesas Mobile Corporation, Tokyo (JP)

( * ) Notice: Subject to any disclaimer, the term of this patent is extended or adjusted under 35 U.S.C. 154(b) by 0 days.

(21) Appl. No.: 13/307,386

(22) Filed: Nov. 30, 2011

(65) Prior Publication Data

US 2013/0136114 A1     May 30, 2013

(30) Foreign Application Priority Data

Nov. 29, 2011  (GB) .................................. 1120537.4

(51) Int. Cl.
*H04W 4/00* (2009.01)
*H04M 11/04* (2006.01)

(52) U.S. Cl.
USPC ........................................ 370/338; 455/404.1

(58) Field of Classification Search
USPC ............................. 370/338; 455/404.1, 404.2
See application file for complete search history.

(56) References Cited

U.S. PATENT DOCUMENTS

| | | | |
|---|---|---|---|
| 2003/0084338 A1 | 5/2003 | Ito | 713/200 |
| 2006/0121877 A1* | 6/2006 | Raghuram et al. | 455/404.2 |
| 2012/0076121 A1* | 3/2012 | Choi et al. | 370/338 |
| 2012/0082029 A1 | 4/2012 | Liao | |
| 2012/0224528 A1* | 9/2012 | Tapia et al. | 370/328 |

FOREIGN PATENT DOCUMENTS

| | | |
|---|---|---|
| EP | 2 440 002 A2 | 4/2012 |
| EP | 2 440 002 A3 | 5/2012 |

OTHER PUBLICATIONS

3GPP TS 23.060 V10.5.0 (Sep. 2011), Technical Specification, 3$^{rd}$ Generation Partnership Project; Technical Specification Group Services and System Aspects; General Packet Radio Service (GPRS); Service Description; Stage 2 (Release 10), (pp. 1, 31 and 54).
3GPP TS 23.401 V10.5.0 (Sep. 2011), Technical Specification, 3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 10), (pp. 1, 25, 26, 36, 37 and 59).

(Continued)

*Primary Examiner* — Afshawn Towfighi
(74) *Attorney, Agent, or Firm* — Lucas & Mercanti LLP; Robert P. Michal

(57) ABSTRACT

A user equipment UE with an active connection (radio or logical) with a wireless network needs to establish an emergency service. The UE unilaterally deactivates an active session or context with the wireless network, and thereafter sends to the wireless network signaling to establish the emergency service, in which the signaling specifically identifies the service as an emergency service. In one embodiment (FIG. 1) the UE locally detaches from an active packet domain communication and sends an emergency attach so as to clear resources. In another embodiment (FIG. 2) the UE deactivates one or more contexts and sends an extended service request which identifies one or more context which remains active after the deactivating. In another embodiment (FIG. 3), after the signaling to establish the emergency service (SERVICE REQUEST) the UE sends a deactivation message explicitly indicating which context(s) is/are deactivated (PDN CONTEXT DEACTIVATION or PDN DISCONNECT REQUEST).

17 Claims, 5 Drawing Sheets

OTHER PUBLICATIONS

3GPP TS 24.008 V10.4.0 (Sep. 2011), Technical Specification, $3^{rd}$ Generation Partnership Project; Technical Specification Group Core Network and Terminals; Mobile Radio Interface Layer 3 Specification; Core Network Protocols; Stage 3, (Release 10), (pp. 1, 68, 69, 200, 201, 262, 349 and 530).

3GPP TS 24.301 V10.4.0 (Sep. 2011), Technical Specification, $3^{rd}$ Generation Partnership Project; Technical Specification Group Core Network and Terminals; Non-Access-Stratum (NAS) Protocol for Evolved Packet System (EPS); Stage 3, (Release 10), (pp. 1, 48, 126, 149, 150, 166, 206, 212, 213 and 243).

Office Action (Examination Report under Section 18(3)) issued Feb. 21, 2013 in related U.K. Application No. GB 1120537.4 (20 pages).

3GPP TSG-CT WG1 Meeting #66, C1-102961, "Handling of an Emergency EPS Context When User Plane Radio Bearer Can Not Be Established", Xi'an (P.R. China), Aug. 23-27, 2010, XP050648258 (3 pages).

3GPP TR 23.867 V\7.1.0 (Dec. 2005) Technical Report, $3^{rd}$ Generation Partnership Project; Technical Specification Group Services and System Aspects, Internet Protocol (IP) based IP Multimedia Subsystem (IOMS) emergency sessions (Release 7); Sophia-Antipolis Cedex, France, Dec. 1, 2005, XP050364009 (81 pages).

3GPP TSG-CT WG1 Meeting #76, C1-102545, "PDP context and EPS bearer context for emergency call", Xiamen China, Feb. 6-10, 2012, XP050556806 (5 pages).

PCT International Search Report mailed Apr. 8, 2013, which is issued in a related PCT International Application No. PCT/IB2012/056760, filed Nov. 27, 2012 (3 pages).

\* cited by examiner

DEACTIVATING EXISTING BEARER/CONTEXT FOR EMERGENCY BEARER ESTABLISHMENT

TECHNICAL FIELD

The exemplary and non-limiting embodiments of this invention relate generally to wireless communication systems, methods, devices and computer programs, and more specifically relate to establishing wireless emergency services particularly when too many resources are in use for non-emergency purposes.

BACKGROUND

The following abbreviations that may be found in the specification and/or the drawing figures are defined as follows:
  3GPP third generation partnership project
  DL downlink
  EPS evolved packet system
  EUTRAN evolved UTRAN
  GPRS general packet radio service
  IMS Internet protocol multimedia subsystem
  PDN packet data network
  PDP packet data protocol
  PS packet switched (domain)
  QCI quality class indicator
  RAT radio access technology
  RR radio resource
  RRC radio resource control
  UE user equipment
  UL uplink
  UTRAN universal terrestrial radio access network
  VoIP voice over Internet protocol IMS services such as IMS VoIP use a PS domain bearer for PS connectivity in the serving network. IMS voice emergency sessions also use PS domain bearers (see 3GPP TS 23.060 v10.5.0 and 3GPP TS 23.401 v10.5.0). The PS domain provides the bearer as PDN connections that consist of one or more contexts as detailed at 3GPP TS 23.401 v10.5.0. "Contexts" in the GPRS radio access technology refers to PDP contexts, and in the EPS radio access technology refers to EPS bearer contexts. 3GPP TS 24.008 v10.4.0 and 3GPP TS 24.301 v10.4.0 detail that the UE may support a maximum of 11 simultaneous contexts. This is the maximum allowed by the 3GPP system and different UE models and manufacturers may support less than the maximum 11 contexts. For example, EUTRAN category 3 devices require only eight contexts. Certain other implementation reasons may leave a UE with the capacity to support only a maximum of six contexts, though in practice some widely deployed UEs support up to five contexts, many networks support only three and it appears that at least one mobile device operating system is limited to supporting only one context for its host UE.

In practice, it is possible that any given UE has PS domain bearers established for other purposes at the time the UE sees the need to establish PS emergency bearer services. In normal operation an IMS VoIP capable UE may have several contexts established; IMS VoIP itself reserves one context for signaling purposes that is used for registering to the IMS and also to establish normal (non-emergency) sessions. Then the UE may also have an additional PDN connection.

The PDN need not support IP dual stack (IPv4 and IPv6), in which case the PDN supporting both IP versions instructs the UE to establish separate PDN connections; one for IPv4 traffic and one for IPv6 traffic (see 3GPP TS 24.008 v10.4.0 and 3GPP TS 24.301 v10.4.0; these specifications use the term should instead of may for the network 'instructing' summarized above). This network configuration can double the number of active contexts that the UE must handle in parallel.

Regardless of the number of simultaneous contexts supported by the UE and the capabilities of the UE and the network to support (or not) dual stack bearers and different IP versions, it is possible that at a given time for a given UE the maximum number of contexts have already been activated for other purposes at the time of emergency VoIP voice call establishment. The UE will detect that it does not have enough resources to proceed with PS emergency bearer establishment due to too many active contexts.

A typical network configuration would still allow emergency access via so called Access Class 10 for a UE whose access for other services is barred (see 3GPP TS 22.011 v11.1.0 clause 4.4). Access Class 10 is broadcast in system information and informs UEs in the cell whether they are allowed to initiate an emergency call regardless of their access class barring status, so this allows the UE to establish an emergency call. Context deactivation is a normal priority procedure and subject to barring, so if the UE already has got its maximum number of active contexts, it is not allowed to deactivate PDP contexts in GPRS or to disconnect the PDN in EPS in order to relieve the necessary resources for the subsequent emergency call that would be allowed in this situation. But IMS emergency services are not yet deployed in real networks and devices, and so these problems related to establishing them have not yet been encountered in practice. Below is a review of relevant procedures for emergency services in GPRS and EPS networks.

There is an option already specified for a UE to use a PS attach procedure for emergency purposes, but this is restricted to a strictly limited service case when the UE cannot attach to the network for any other than emergency services (see 3GPP TS 24.008 v10.4.0 and 3GPP 24.301 v10.4.0). Those same specifications detail a service request procedure for a UE to initiate new services that has already successfully attached to the network. The GPRS service request contains PDP context status for the purpose of synchronizing the PDP context status between the UE and the network, if for some reason re-synchronizing is necessary.

If the UE has run out of EPS bearer contexts or GPRS PDP contexts, then it is allowed (per 3GPP TS 24.008 v10.4.0 and 3GPP 24.301 v10.4.0) to relieve either some or all of those resources by means of a UE-initiated EPS PDN disconnect procedure or a PDP context deactivation in GPRS and then establish the connectivity that is required for a PS emergency call. There are two shortfalls with this prior art approach: a) it imposes a long delay to establish an emergency call, and b) it may not be possible if the UE's Access Class is barred per clause 4 of 3GPP TS 22.011 v11.1.0.

So in current practice emergency calls can override several obstacles that would otherwise deny the UEs right for uplink access, such as if the UE is in limited service and is not able to attach for normal service or having a network assigned back-off timer miming. But if the UEs access to the network is barred, the UE-initiated deactivation of PDP contexts in GPRS and the UE-requested PDN disconnect procedure in EPS are forbidden. The UE would be allowed to establish an emergency call, but cannot do so since the procedures to relieve the resources that are essentially required for setting up the emergency call are normal priority procedures with no possibility to indicate "emergency" use. See 3GPP TS 44.018 clause 3.3.1.1.1; 3GPP TS 36.331 clause 5.3.3 and 3GPP TS 25.331 clause 8.1.8.

What is needed in the art is a way to assure a UE which needs to establish emergency services may do so under any conditions so long as the UE has sufficient signal strength with the network, and without undue delay given the emergency nature of the call.

SUMMARY

The foregoing and other problems are overcome, and other advantages are realized, by the use of the exemplary embodiments of this invention.

In a first exemplary embodiment of the invention there is an apparatus comprising at least one processor and at least one memory storing a computer program. In this embodiment the at least one memory with the computer program is configured with the at least one processor to cause the apparatus to at least: in response to determining that a user equipment having an active connection with a wireless network needs to establish an emergency service, unilaterally deactivate by the user equipment an active session or context with the wireless network; and thereafter send to the wireless network signaling to establish the emergency service, in which the signaling specifically identifies the service as an emergency service.

In a second exemplary embodiment of the invention there is a method comprising: in response to determining that a user equipment having an active connection with a wireless network needs to establish an emergency service, unilaterally deactivating an active session or context with the wireless network; and thereafter sending to the wireless network signaling to establish the emergency service, in which the signaling specifically identifies the service as an emergency service.

In a third exemplary embodiment of the invention there is a computer readable memory tangibly storing a computer program executable by at least one processor, the computer program comprising: code for unilaterally deactivating an active session or context with the wireless network in response to determining that a user equipment having an active connection with a wireless network needs to establish an emergency service; and thereafter code for sending to the wireless network signaling to establish the emergency service, in which the signaling specifically identifies the service as an emergency service.

DETAILED DESCRIPTION

In general, a UE which has too many active contexts to add another for an emergency call will need to prioritize its emergency request above the other services and make the necessary resources available, even if it means deactivating some other connections that are used for lower priority services. The network needs to be informed about the UE's context status, which contexts are kept and which one is deactivated, to relieve resources for the PS emergency call. This problem is particularly difficult for EPS technology where there is no means for the UE to indicate the current EPS bearer context status to the network. In GPRS it is less difficult because the UE uses GPRS mobility management protocol service requests that contain a PDP status information element, though in GPRS the UE still needs to have some means for deactivating PDP contexts to ensure resources are available for an IMS emergency session.

One aspect of these teachings is how the UE selects which ongoing (non-emergency) services to abandon in favor of establishing a higher priority emergency call, as well as the means to indicate this choice to the network with minimum signaling overhead. In order to optimize the signaling to speed up the emergency call establishment, certain embodiments of these teachings detailed below utilize implicit signaling; this avoids extra delays caused by session management protocol deactivation signaling that would have to be executed prior to when the UE first actually requests PS emergency bearer services.

Figure 1:
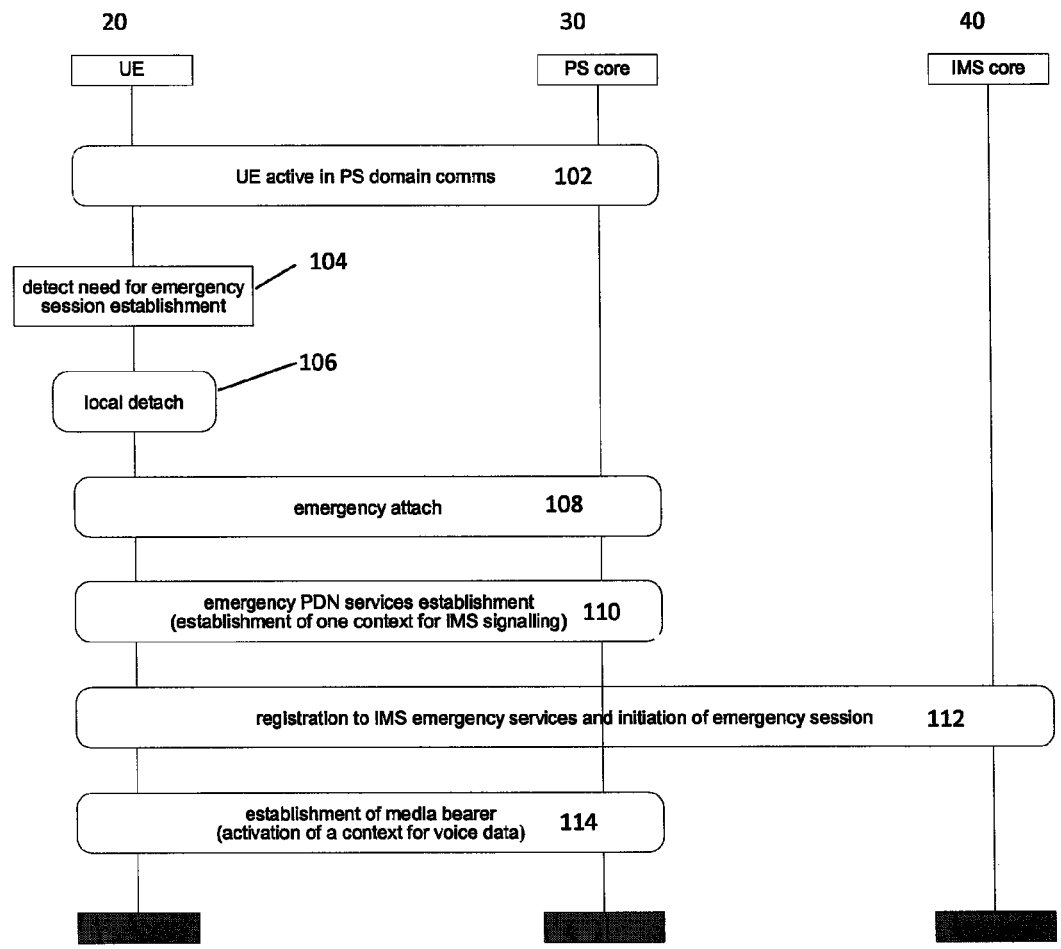
FIG. 1 is a signaling diagram illustrating a local detach followed by an emergency attach for UE that is already attached to a cell needing to establish emergency services, according to an exemplary embodiment of these teachings.
Figure 2:
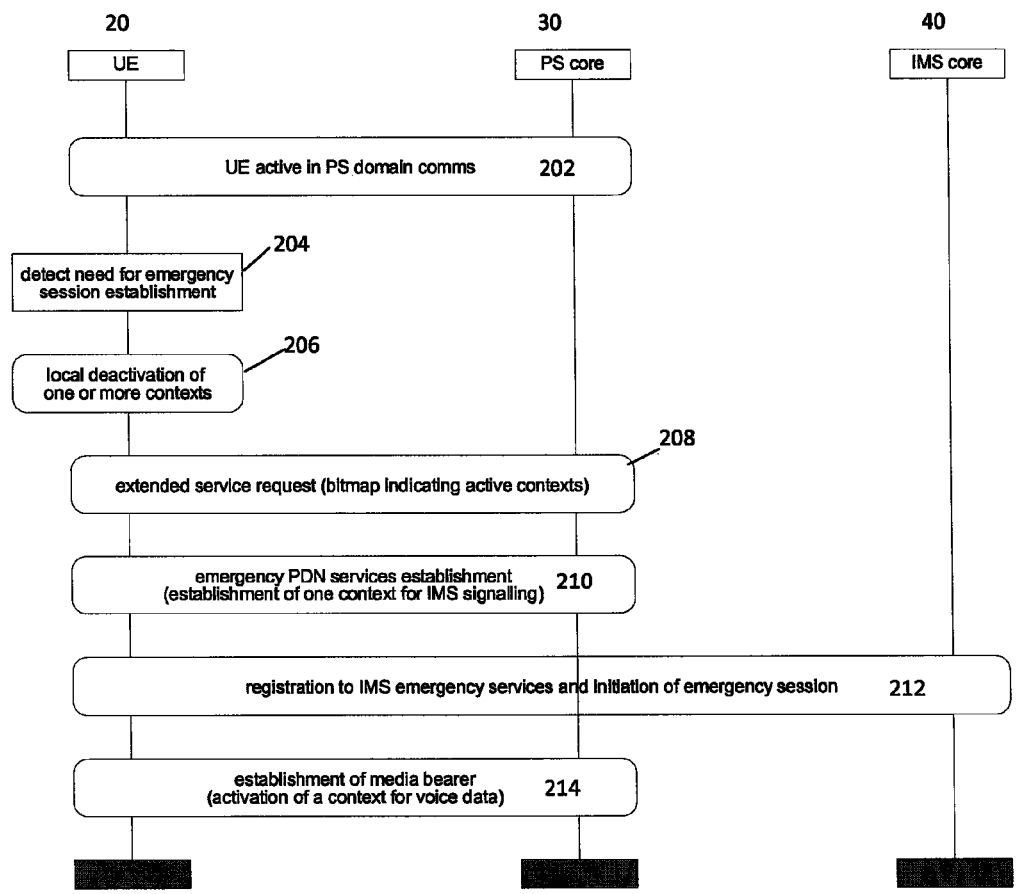
FIG. 2 is a signaling diagram illustrating a UE's local deactivation of contexts followed by its SERVICE REQUEST indicating context status for establishing emergency services according to an exemplary embodiment of these teachings.

This situation, in which the UE needing an emergency service for which it has no excess PDP or EPS contexts, is resolved by the example implementations shown at FIGS. 1-2. Namely, the UE selects one or more contexts that are locally deactivated, and uses enhanced signaling to request the emergency services of the wireless network. One such enhanced signaling is to use an Extended Service Request procedure instead of the conventional Service Request procedure.

But as noted in the background section above, there is another problem in prior art emergency call setup in that there is a process for a UE which is camped in a cell but not attached to the network to establish an emergency call, but no process to do so if the UE is already attached to the network, even if it's not using all its contexts. When the UE is attached the core network is aware of the UE's presence since the core network authorizes that attachment, but if the UE is only camping on the cell the core network is not aware of its presence. The procedure the UE must use in that latter 'attached' case is to request a normal connection, which the UE is not able to specify is for an emergency service. If there are insufficient resources in the cell the UE's request may easily be denied since the network will not know that request is for preparing a subsequent emergency request.

This situation is resolved by the example implementation shown at FIG. 1, an emergency attach procedure. While the emergency attach procedure is currently specified to be used by a UE only when attempting PS emergency access while camped on a cell not providing normal services, FIG. 1 shows an adaptation which resolves the problems above in case the UE is attached to the network rather than only camped in a cell, namely a local detach followed by an emergency attach.

Figure 5:
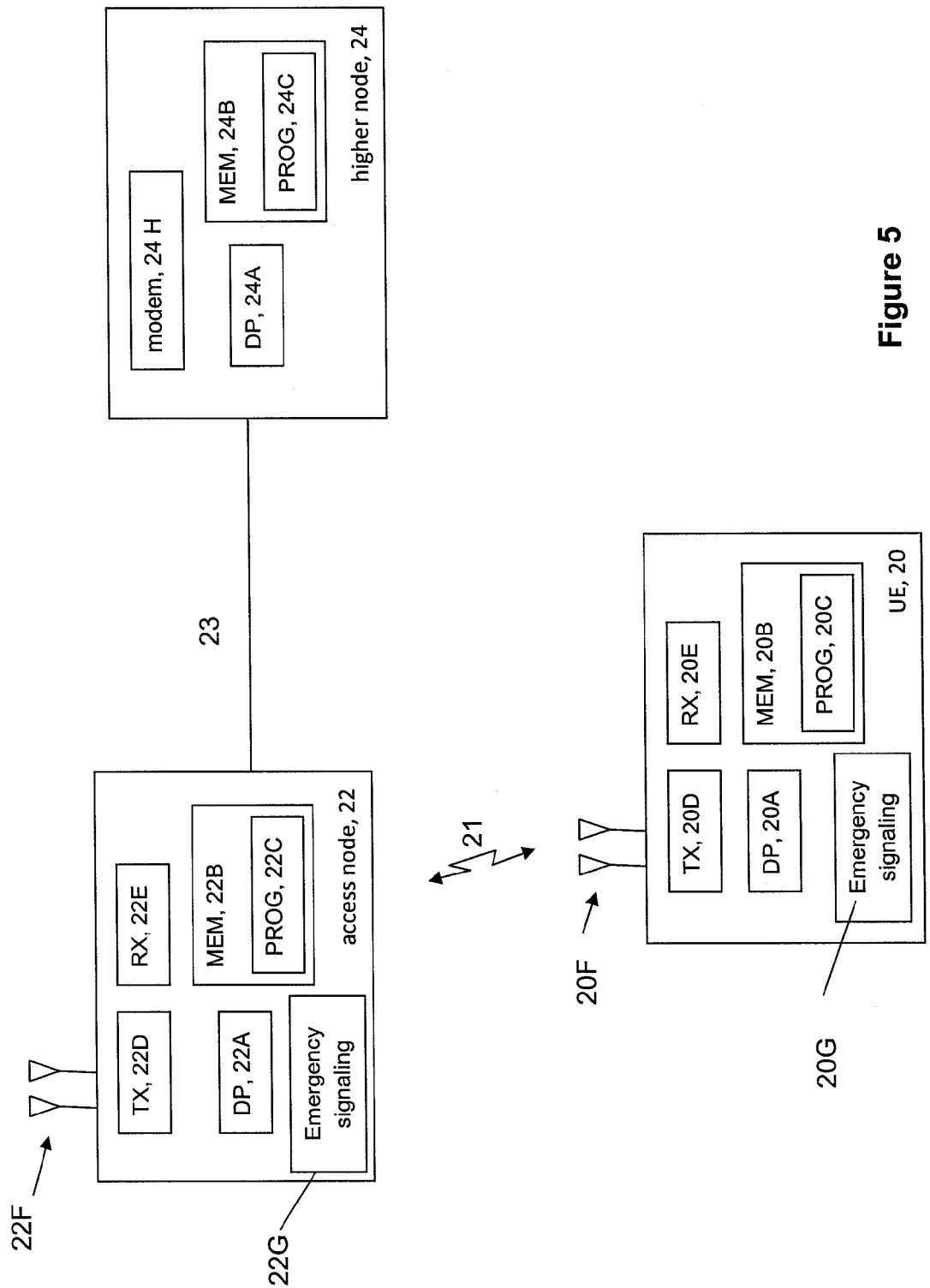
FIG. 5 is a simplified block diagram showing the UE and a network access node, and are exemplary electronic devices suitable for use in practicing the exemplary embodiments of this invention.

FIG. 1 is a signaling diagram illustrating this solution. For each of FIGS. 1-3, there is illustrated signaling between the UE 20, a packet switched core network 30 and an IMS core network 40. From the UE's perspective the signaling is between itself and a network access node such as a NodeB or an eNB as shown at FIG. 5; that access node then relays the relevant messages (or content thereof) to the PS core network 30 which as shown further relays the relevant information to and from the IMS network 40.

FIG. 1 begins with the UE 20 having an active PS connection 102 with the PS core network 30. This means the UE is attached to the network, and as noted above this precludes the UE 20 from using the conventional emergency attach procedure which is reserved only for UEs which are only camped in the cell (for example, if the UE is not allowed normal access to this cell but is allowed to access it for emergency purposes only). At 104 the UE detects a need to establish an emergency data session. For example, the UE may be a vehicle mounted device using the PS domain connection for real-time navigation when an auto accident occurs and the UE knows, from a particular user input (or series of inputs) or from automatic connection to crash/airbag deployment sensors, to establish an emergency connection. At block 106 the UE unilaterally locally detaches from the connection of 102 and the UE sends an emergency attach message at 108. In an embodiment there is no additional user input needed for the local detach 106 operation; initiating an emergency call as noted in the example auto accident scenario above is sufficient to trigger both the local detach 106 and the emergency attach 108 protocols.

Initiating the emergency attach 108 with the local detach 106 allows the UE to start 'from clear' to proceed with the emergency attach 108, that is, the UE starts the emergency attach 108 without an existing attachment 102 to the network. This establishes a mobility management connection for session management protocol and clears the reserved resources which were reserved for the previous attach 102, freeing those resources for establishing the emergency session.

Figure 3:
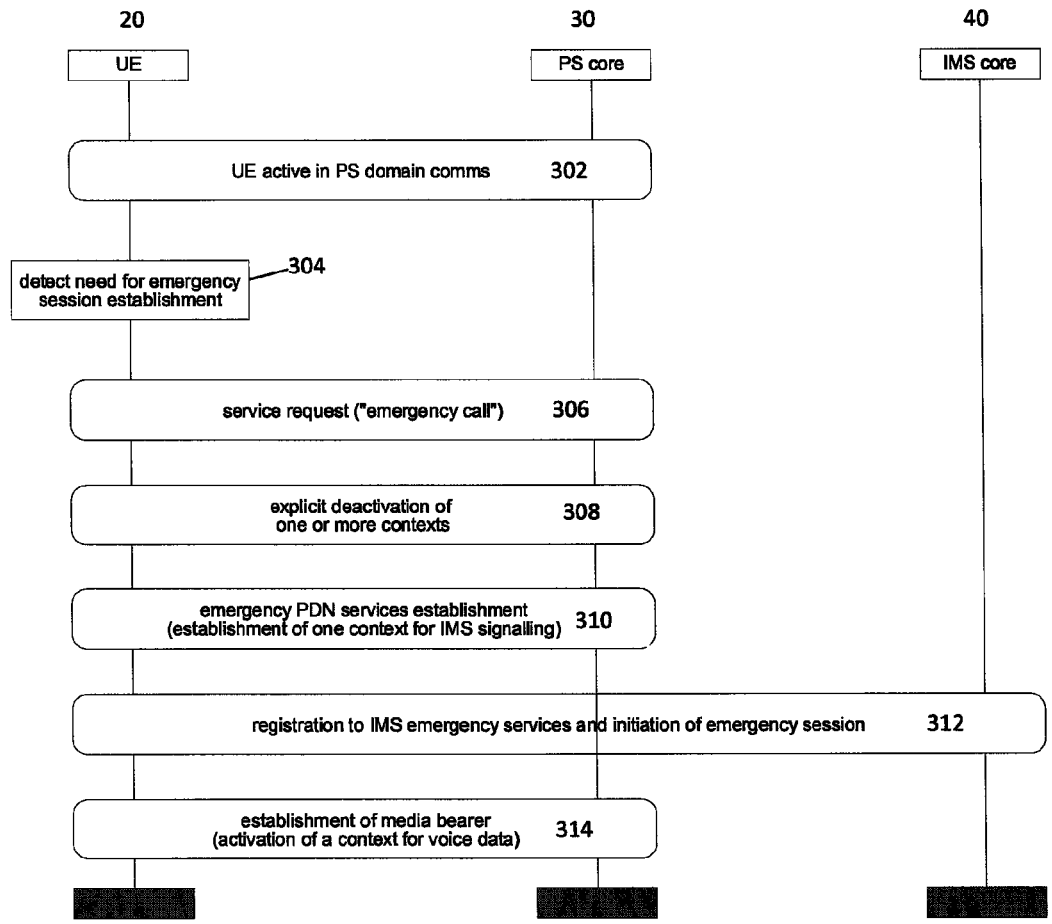
FIG. 3 is a signaling diagram illustrating a UE's deactivation of contexts followed by establishment of emergency contexts according to an exemplary embodiment of these teachings.

The remainder of FIG. 1 is similar also at FIGS. 2-3, with exceptions noted for the IMS registration 112, 212 and 312. Specifically, following the emergency attach message 108 the PS core network 30 and the UE 20 exchange signaling to establish emergency PDN services 110, such as for example to establish a single PDP (GPRS) or EPS context for IMS signaling. Once established the session is registered to the IMS core network 40 and the emergency session is established at 112, and finally the PS core network 30 can establish for the UE 20 a media bearer 114 for which the context established at 110 will be active, a VoIP context on the emergency session in this example. Since the UE detaches at block 106 of FIG. 1, the registration to the IMS at message exchange 112 of FIG. 1 is always required after the PDN is established at message exchange 110. The FIG. 1 embodiment is quite useful for the case there is a resource shortage in the network. This is because if the UE were to simply request another bearer by conventional procedures it could not indicate to the network that the requested bearer was for emergency services.

The embodiment of FIG. 2 utilizes an extended service request to establish emergency signaling and to indicate the UE's context status, to inform the network of those contexts which the UE 20 has locally deactivated. In this embodiment, before signaling anything to the network 30 the UE 20 has detected that is has too many active contexts in its active PS domain communications 202 to co-exist with an IMS emergency session which the UE 20 would like to establish after detecting a need for it at 204.

In an embodiment of these teachings there is an algorithm by which the UE 20 methodically chooses which one or more PDP or EPS contexts to locally deactivate. In order to assure that the network can provide a VoIP bearer that ensures a sufficient amount of resources for the emergency call (for example, aggregate downlink and uplink bit rates for the UE 20), the UE 20 will deactivate some or all bearer resources that provide guaranteed bit rates. If these alone do not free up enough resources the next contexts to be deactivated are the remaining non-guaranteed bit rate bearers. More particularly, in one specific embodiment the selection algorithm goes through the established bearers in their priority order, QCI 4-QCI 1, QCI 9-QCI5. QCI is a scalar representing quality of service class identifier that is used as a reference to access node-specific parameters that control bearer level packet forwarding treatment (e.g. scheduling weights, admission thresholds, queue management thresholds, link layer protocol configuration, etc.). The UE may also apply activity monitoring in determination of PDP or EPS contexts to be deactivated; those with little activity are considered a lower priority, and the algorithm considers them sooner for deactivation, than bearers having a higher level of traffic/activity.

Once the UE 20 has locally deactivated one or more of its PDP or EPS contexts the UE prepares an extended service request 208 to inform the network which contexts remain active (for example, a bitmap). The use of the extended service request is currently used for circuit-switched fall back (see 3GPP TS 24.301 v10.4.0, which specifies that circuit-switched services can be used in case packet-switched services cannot) and contains an information element to synchronize the EPS context status between the UE and the network only for that circuit switched fall back. The normal service request enables no such synchronization. Typically, the circuit-switched fall back is used for speech or short-message-service/text messaging scenarios. In the FIG. 2 embodiment there is a new service type (for example, added to subclause 9.9.3.27 of 3GPP TS 24.301 v10.4.0) allocated for emergency session use. This new service type enables the extended service request to be used for emergency signaling connection establishment. In order that this embodiment may be easily backward compatible with legacy signaling there is a value reserved with the default handling of the service type 'packet services via S1' for indicating emergency signaling connection establishment. This signaling connection is then used for activating a context for IMS emergency session initialization. In the reference specification version, the extended service request PDU already contains an EPS bearer context status information element that the UE 20 can use in the FIG. 2 embodiment to indicate to the network 30 all the remaining contexts that the UE 20 has not deactivated and which the UE 20 still considers active prior to the emergency bearer establishment. That is, the UE 20 locally deactivates one or more PDP or EPS contexts at 206 and the status information element in the extended service request 208 is used for synchronizing its current context status information with the network 30.

The extended service request 208 establishes the RR connection at 210 with the access stratum/access node of the network and indicates 'emergency' as the establishment cause. This cause is delivered by the radio access network (GPRS or EPS) to the packet switched core network 30 in S1 connection establishment signaling. Since the emergency PDN services establishment signaling 210 identifies 'emergency' as the establishment cause, in a particular embodiment of these teachings there is no similar indicator of 'emergency' in the extended service request 208 (for example, such an emergency indication is absent from the 'service type' field of that message 208). In other embodiments the 'service type' field of message 208 indicates emergency service in addition to the emergency establishment cause in message 210.

For the remainder of FIG. 2, the PS core network 30 and the UE 20 exchange signaling to establish emergency PDN services 210, such as for example to establish a single PDP (GPRS) or EPS context for IMS signaling. Once established the session is registered to the IMS core network 40 and the emergency session is established at 212, and finally the PS core network 30 can establish for the UE 20 a media bearer 214 for which the PDP or EPS context established at 210 will be active, a VoIP context on the emergency session in this example.

A new registration to the IMS services at exchange 212 may or may not be needed. IMS registration is made with dedicated signaling on a default bearer to a specific PDN. For FIG. 1 any previous registration from the UE being attached at 102 was lost from its detach at 106. In FIG. 2 there is no detach, only a PDP or EPS context deactivation at 206. So the UE may in some cases remain registered to its home public land mobile network which can provide the IMS services, in which case there is no additional IMS registration needed at exchange 212. The IMS registration in the exchange of 212 is conditional on whether the network requires a new PDN connection for the UE 20 to a local access point that will provide local IMS emergency service (the network indicates whether it supports this 'emergency bearer services' feature through evolved mobility management EMM and GPRS mobility management GMM signaling). 3GPP TS 23.167 clause 7.2 lists a set of conditions which must be met before a UE can initiate an emergency IMS registration (either not registered or roaming; has sufficient credentials to authenticate; and is able to detect an emergency session) and in an exemplary embodiment of these teachings those also give the conditions under which the UE registers to IMS emergency services at message exchange 212.

While the embodiments of FIGS. 1-2 are based on local deactivation of PDP or EPS contexts without the UE specifically signaling that deactivation to the network, the FIG. 3 embodiment details explicit signaling by the UE of the deactivated PDP or PDN context(s) following the UE's service request for an emergency call. As with FIG. 2, at FIG. 3 before signaling anything to the network 30 the UE 20 has detected that is has too many active PDP (GPRS) or EPS contexts in its active PS domain communications 302 to co-exist with an IMS emergency session which the UE 20 would like to establish after detecting a need for it at 304. In this embodiment also the UE 20 may apply a prioritization algorithm as detailed above for the FIG. 2 embodiment so as to determine which of its active context(s) is/are to be deactivated and which are to be retained. The UE 20 must be able to signal at 308 a sufficient number of contexts which are de-activated to make space for the subsequent emergency connectivity, which means the conventional requirement for the UE to analyze whether or not it is barred need to be changed.

In conventional practice before a PDN disconnect the UE needs to initiate a service request procedure but 3GPP TS 24.301 v10.4.0 at Annex D.1 allows the UE to indicate the RRC establishment cause as "emergency calls" only if the SERVICE REQUEST message is sent for the following reasons:

If a SERVICE REQUEST is to request user plane radio resources for emergency bearer services, the RRC establishment cause shall be set to Emergency call. (See Note 1)

If a SERVICE REQUEST is triggered by a PDN CONNECTIVITY REQUEST that has request type set to "emergency", the RRC establishment cause shall be set to Emergency call. (See Note 1)

For the second item above, the conventional procedures provide that the SERVICE REQUEST for PDN DISCONNECT REQUEST shall be sent using "originating calls" RRC establishment cause, which for the case of FIG. 3 does not give the network any indication of the real reason for the disconnect which is to relieve resources for a subsequent emergency request that will follow as soon as the required resources are available. In a normal case this only reduces the priority of the procedure that is preparing ground for emergency request, but if the UEs Access Class is barred, this drawback blocks the PS emergency call completely as no PDN connectivity resources can be freed for the emergency request.

Therefore, in this embodiment the UE 20 will send the SERVICE REQUEST 306 which has the RRC establishment cause identified as "emergency call" prior to the PDN DISCONNECT REQUEST 308. To implement this in GPRS and EPS the relevant specifications will need to be adapted to allow this order of the messages.

It is also advantageous that the PDN context deactivation (GPRS) and PDN disconnect (EPS) procedures (both message 308 of FIG. 3) should be initiated with indicated RRC establishment cause "emergency calls" or by overriding the Access Class Barring evaluation for context deactivation that is required for subsequent outgoing emergency connectivity request.

Following the UE's service request indicating emergency session 306 and the indication of which contexts the UE deactivated 308 the establishment of a PS emergency call proceeds normally and as detailed for FIGS. 1-2. Specifically, the PS core network 30 and the UE 20 exchange signaling to establish emergency PDN services 310, such as for example to establish a single PDP (GPRS) or EPS context for IMS signaling. Once established the session is registered to the IMS core network 40 and the emergency session is established at 312, and finally the PS core network 30 can establish for the UE 20 a media bearer 314 for which the context established at 310 will be active, a VoIP context on the emergency session in this example. The IMS registration at 312 is conditional, using the same conditions described at FIG. 2 for message exchange 212.

Exemplary embodiments of these teachings provide the following technical effects. The solution detailed with respect to FIG. 1 has the advantage of being already a specified procedure, so it is simple to implement as it re-uses a limited service state procedure (camped in the cell only) in the normal service state (attached to the network). It is also an advantage that no additional session management signaling is required. The drawback that all data communications are removed (meaning the UE may need to re-establish connections again after the emergency connection is no longer needed) is seen to be minor since the emergency may be quite severe against possibly trivial non-emergency data sessions.

A technical effect arising from the FIG. 2 embodiment is that all resources that are not absolutely required to process the PS emergency call are preserved. The FIG. 2 embodiment aligns simply with GPRS and so would be quite simple to adopt in that RAT since no additional session management signaling is required. While this embodiment may change the conventional procedure to cover a wider range of services, since this relates to emergency services the change is seen to be worthwhile. There are two main distinctions over the conventional procedures with FIG. 2; namely there is a local deactivation of PDP context (GPRS) or local PDN disconnection (EPS) without explicit signaling, and the PDP context/PDN connection synchronization mechanism is added to the EXTENDED SERVICE REQUEST which is conventionally used for a different purpose and cannot indicate active or deactivated contexts.

It is also possible for another embodiment to enhance the emergency attach of FIG. 1 by adding an EPS context status. This improves the FIG. 1 embodiment at the cost of adding that EPS context status information element to the ATTACH REQUEST message. This may or may not be the most efficient signaling since that information element would remain but be unnecessary for non-emergency attach instances.

The FIG. 3 embodiment provides the technical effect of clearing out the PDP context of PDN connectivity resources in preparation for a subsequent emergency call in the SERVICE REQUEST message, but such explicit signaling is less elegant than the FIG. 2 embodiment. The RRC establishment cause "emergency call" can only be applied from the emergency call related signaling and the SERVICE REQUEST would be signaled using normal priority, but this is the way around the UE's access class being barred and the prior art emergency call establishment not even getting through. This also is easy to adopt since it follows existing procedures fairly closely, with the change that the UE's use of the "emergency call" as its RRC establishment cause or its overriding of its access class being barred.

Figure 4:
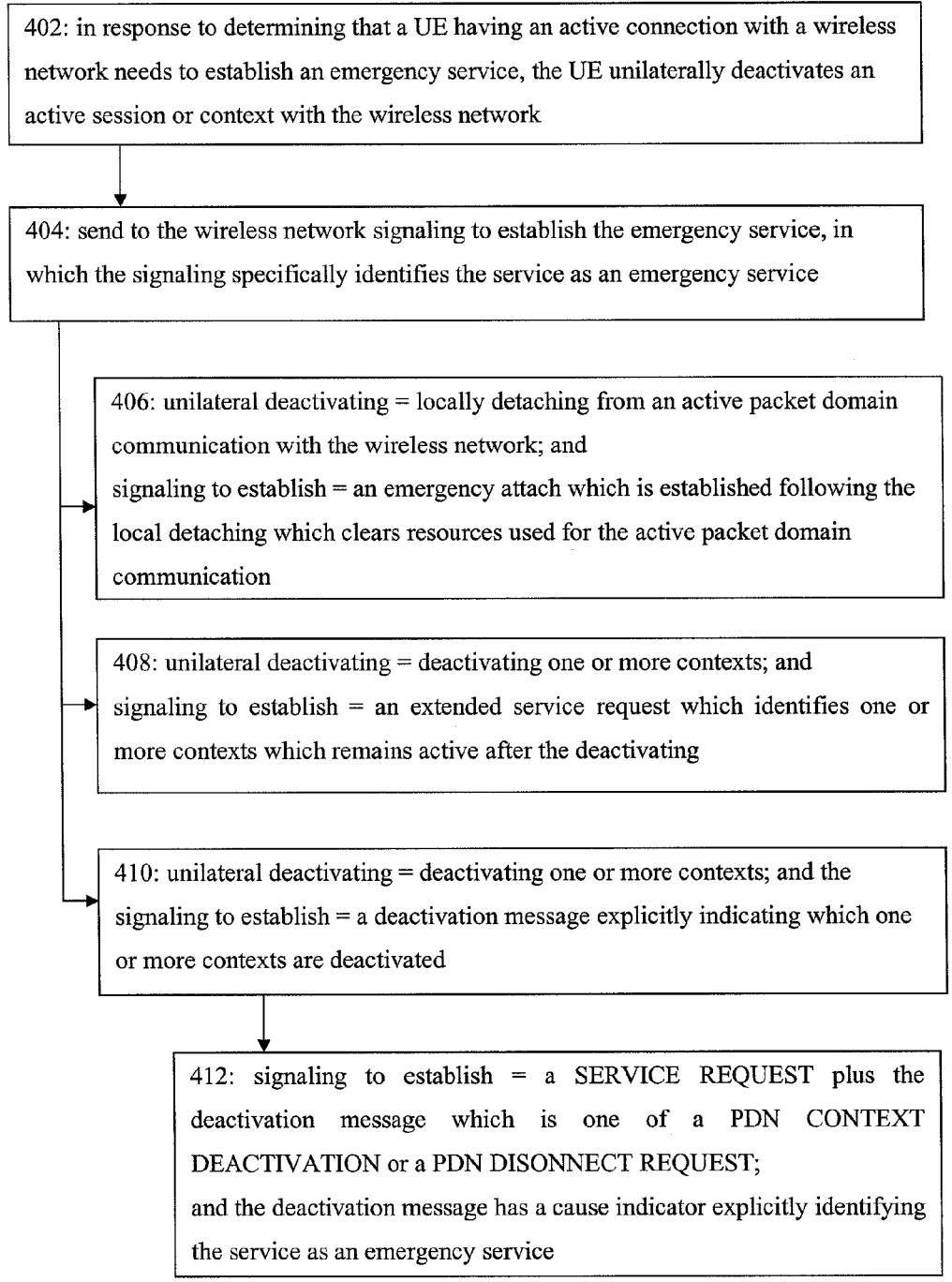
FIG. 4 is a logic flow diagram that illustrates from the perspective of the UE the operation of a method, and a result of execution of computer program instructions embodied on a computer readable memory, in accordance with exemplary embodiments of these teachings.

Now are detailed with reference to FIG. 4 further particular exemplary embodiments from the perspective of the UE 20. FIG. 4 may be performed by the whole UE 20 shown at FIG. 4, or by one or several components thereof such as a modem. At block 402, in response to determining that a UE having an active connection with a wireless network needs to establish an emergency service, the UE unilaterally deactivates an active session or context with the wireless network. For the case shown at FIG. 1 the UE may begin with an active radio connection. For the cases shown at FIGS. 2-3 the UE may be in idle mode and begin with one or more active logical connections but no active radio connection, which have been released and require establishment before any signaling with the network. These two scenarios are evident from the 'active session or context' which in block 402 is deactivated. Thereafter at block 404 the UE sends to the wireless network signaling to establish the emergency service, in which the signaling specifically identifies the service as an emergency service.

Further portions of FIG. 4 represent various of the specific but non-limiting embodiments detailed above. Block 406 relates to the FIG. 1 embodiment and specifies that the unilateral deactivating of block 402 is the UE locally detaching from an active packet domain communication with the wireless network; and that the signaling of block 404 is an emergency attach which is established following the local detaching which clears resources used for the active packet domain communication.

Block 408 relates to the FIG. 2 embodiment, in which the unilateral deactivating of block 402 is at block 408 the UE deactivating one or more (PDP or EPS) contexts; and the signaling of block 404 is an extended service request which identifies one or more contexts which remains active after the deactivating.

Block 410 relates to the FIG. 3 embodiment, in which the unilateral deactivating of block 402 is at block 410 the UE deactivating one or more contexts; and the signaling of block 404 is specifically at block 410 a deactivation message explicitly indicating which one or more contexts are deactivated. Block 412 has further implementation details of this embodiment; the signaling to establish the emergency service comprises a SERVICE REQUEST and the deactivation message comprises one of a PDN CONTEXT DEACTIVATION or a PDN DISCONNECT REQUEST, and the deactivation message has a cause indicator explicitly identifying the service as an emergency service.

FIG. 4 is a logic flow diagram which may be considered to illustrate the operation of a method, and a result of execution of a computer program stored in a computer readable memory, and a specific manner in which components of an electronic device such as the UE are configured to cause that electronic device to operate. The various blocks shown in FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Reference is now made to FIG. 5 for illustrating a simplified block diagram of various electronic devices and apparatus that are suitable for use in practicing the exemplary embodiments of this invention. In FIG. 5 there is a UE 20 in the GPRS or EPS system operating under a network access node 22 (such as a Node B or an eNodeB) via wireless link 21. The radio access network (GPRS or EPS) which includes the access node includes a higher network node (radio network controller RNC or mobility management entity MME) 24 which provides connectivity with further networks such as for example the PS and IMS core networks 30, 40 shown at FIGS. 1-3. There is also a data/control path 23 coupling the access node 22 with the higher network node 22.

The UE 20 includes processing means such as at least one data processor (DP) 20A, storing means such as at least one computer-readable memory (MEM) 20B storing at least one computer program (PROG) 20C, communicating means such as a transmitter TX 20D and a receiver RX 20E for bidirectional wireless communications with the eNB 22 and with the second device 26 via one or more antennas 20F. While only one transmitter and receiver are shown it is understood there may be more than one. Also stored in the MEM 20B at reference number 20G are the emergency bearer establishment signaling procedures according to these teachings as detailed above, and the rules/algorithm for prioritizing contexts as also detailed above.

The access node 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. The emergency bearer establishment signaling procedures according to these teachings as detailed above are stored in the memory 22B of the access node 22 at unit 22G.

The higher network node 24 has functionally similar capabilities for processor 24A, memory 24B and programs 24C. While not particularly illustrated for the UE 20 or access node 22, those apparatus are also assumed to include as part of their wireless communicating means a modem similar to that shown for the higher network node at 24H, and which may be inbuilt on an RF front end chip within those devices 20, 22 and which also carries the TX 20D/22D and the RX 20E/22E.

At least one of the PROGs 20C/22C in the UE 20 and in the network access node 22 is assumed to include program instructions that, when executed by the associated DP 20A/22A, enable the device to operate in accordance with the exemplary embodiments of this invention, as was discussed above in detail. In these regards the exemplary embodiments of this invention may be implemented at least in part by computer software stored on the MEM 20B, 22B which is executable by the DP 20A/22A of the devices 20, 22; or by hardware, or by a combination of tangibly stored software and hardware (and tangibly stored firmware). Electronic devices implementing these aspects of the invention need not be the entire apparatus 20, 22, as shown, but exemplary embodiments may be implemented by one or more components of same such as the above described tangibly stored software, hardware, firmware and DP, or a system on a chip SOC or an application specific integrated circuit ASIC or a digital signal processor DSP.

In general, the various embodiments of the UE 20 can include, but are not limited to: data cards, USB dongles, cellular telephones; personal portable digital devices having wireless communication capabilities including but not limited to laptop/palmtop/tablet computers, digital cameras and music devices, Internet appliances, remotely operated robotic devices or machine-to-machine communication devices.

Various embodiments of the computer readable MEMs 20B/22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A/22A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the GPRS and EPS systems, it should be appreciated that the exemplary embodiments of this invention are not limited for use with only this one particular type of wireless communication system, and that they may be used to advantage in other wireless communication systems such as for example UTRAN and others in which UEs may need to set up emergency services while already attached to the network.

Some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus for a user equipment comprising:
a processing system comprising at least one processor and at least one memory storing a computer program;
in which the at least one memory with the computer program is configured with the at least one processor to cause the apparatus to at least:
in response to determining that the user equipment, which has an active connection with a wireless network, needs to establish an emergency service, unilaterally deactivate by the user equipment an active session or context with the wireless network; and thereafter
send to the wireless network with which the active session or context was deactivated, signaling to establish the emergency service, in which the signaling specifically identifies the service as an emergency service
wherein the signaling to establish the emergency service comprises an extended service request that identifies one or more contexts that remain active after the unilateral deactivation of an active session or context by the user equipment and based thereon, current context status information of the user equipment being synchronized with the wireless network, and then
establish an emergency service using that wireless network with which the active session or context was deactivated by the user equipment.

2. The apparatus according to claim 1, in which:
unilaterally deactivating the active session or context comprises the user equipment locally detaching from an active packet domain communication with the wireless network; and
the signaling to establish the emergency service further comprises an emergency attach which is established following the local detaching which clears resources used for the active packet domain communication.

3. The apparatus according to claim 1, in which:
unilaterally deactivating the active session or context comprises the user equipment deactivating one or more contexts.

4. The apparatus according to claim 1, in which:
deactivating the active session or context comprises the user equipment deactivating one or more contexts via explicit signaling to the wireless network;
in which the at least one memory with the computer program is configured with the at least one processor to cause the apparatus to send to the wireless network, after the signaling to establish the emergency service, a deactivation message explicitly indicating which one or more contexts are deactivated.

5. The apparatus according to claim 4, in which the signaling to establish the emergency service comprises a SERVICE REQUEST and the deactivation message comprises one of a PDN CONTEXT DEACTIVATION or a PDN DISCONNECT REQUEST, in which the deactivation message comprises a cause indicator explicitly identifying the service as an emergency service.

6. The apparatus according to claim 1, in which the at least one memory with the computer program is configured with the at least one processor to cause the apparatus to, after sending the signaling to establish the emergency service:
establish packet data network services with one context for Internet protocol multimedia subsystem signaling;
register to and establish an emergency session with an Internet Protocol multimedia subsystem; and
establish a media bearer and activate a voice data context for the established emergency session.

7. A method carried out by a user equipment comprising:
in response to determining that the user equipment, which has an active connection with a wireless network, needs to establish an emergency service, unilaterally deactivating an active session or context with the wireless network; and thereafter
sending to the wireless network with which the active session or context was deactivated, signaling to establish the emergency service, in which the signaling specifically identifies the service as an emergency service, wherein the signaling to establish the emergency service comprises an extended service request that identifies one or more contexts that remain active after the unilateral deactivation of an active session or context by the user equipment and based thereon, current context status information of the user equipment being synchronized with the wireless network, and then establishing an emergency service using the wireless network with which the active session or context was deactivated.

8. The method according to claim 7, in which unilaterally deactivating the active session or context comprises the user equipment locally detaching from an active packet domain communication with the wireless network; and the signaling to establish the emergency service further comprises an emergency attach which is established following the local detaching which clears resources used for the active packet domain communication.

9. The method according to claim 7, in which:

unilaterally deactivating the active session or context comprises the user equipment deactivating one or more contexts.

10. The method according to claim 7, in which:

deactivating the active session or context comprises the user equipment deactivating one or more contexts via explicit signaling to the wireless network;

the method further comprising, after the signaling to establish the emergency service, sending to the wireless network a deactivation message explicitly indicating which one or more contexts are deactivated.

11. The method according to claim 10, in which the signaling to establish the emergency service comprises a SERVICE REQUEST and the deactivation message comprises one of a PDN CONTEXT DEACTIVATION or a PDN DISCONNECT REQUEST, in which the deactivation message comprises a cause indicator explicitly identifying the service as an emergency service.

12. The method according to claim 7, the method further comprising, after sending the signaling to establish the emergency service:

establishing packet data network services with one context for Internet protocol multimedia subsystem signaling;

registering to and establishing an emergency session with an Internet Protocol multimedia subsystem; and establishing a media bearer and activate a voice data context for the established emergency session.

13. A non-transitory computer readable memory tangibly storing a computer program executable by at least one processor, the computer program comprising:

code to be executed on a processing system of a user equipment, the code being for:

unilaterally deactivating an active session or context with the wireless network in response to determining that a user equipment having an active connection with the wireless network needs to establish an emergency service; and thereafter sending to the wireless network with which the active session or context was deactivated, signaling to establish the emergency service, in which the signaling specifically identifies the service as an emergency service, wherein the signaling to establish the emergency service comprises an extended service request that identifies one or more contexts which remain active after the unilateral deactivation of an active session or context by the user equipment and based thereon, current context status information of the user equipment being synchronized with the wireless network, and then establishing an emergency service using the wireless network with which the active session or context was deactivated.

14. The non-transitory computer readable memory according to claim 13, in which the code for unilaterally deactivating the active session or context operates to locally detach the user equipment from an active packet domain communication with the wireless network; and the signaling to establish the emergency service further comprises an emergency attach which is established following the local detaching which clears resources used for the active packet domain communication.

15. The non-transitory computer readable memory according to claim 13, in which:

the code for unilaterally deactivating the active session or context operates to deactivate one or more contexts of the user equipment.

16. The non-transitory computer readable memory according to claim 13, in which:

the code for deactivating the active session or context operates to deactivate one or more contexts of the user equipment via explicit signaling to the wireless network; and the computer readable memory further comprising, code for sending to the wireless network, after the signaling to establish the emergency service, a deactivation message explicitly indicating which one or more contexts are deactivated.

17. The non-transitory computer readable memory according to claim 16, in which the signaling to establish the emergency service comprises a SERVICE REQUEST and the deactivation message comprises one of a PDN CONTEXT DEACTIVATION or a PDN DISCONNECT REQUEST, in which the deactivation message comprises a cause indicator explicitly identifying the service as an emergency service.

* * * * *